(12) United States Patent
McNeilly

(10) Patent No.: US 9,810,285 B2
(45) Date of Patent: Nov. 7, 2017

(54) LEVER BINDER

(71) Applicant: Cecil McNeilly, Campbell River (CA)

(72) Inventor: Cecil McNeilly, Campbell River (CA)

( * ) Notice: Subject to any disclaimer, the term of this patent is extended or adjusted under 35 U.S.C. 154(b) by 0 days.

(21) Appl. No.: 15/037,059

(22) PCT Filed: Nov. 18, 2014

(86) PCT No.: PCT/IB2014/002925
§ 371 (c)(1),
(2) Date: May 17, 2016

(87) PCT Pub. No.: WO2015/075547
PCT Pub. Date: May 28, 2015

(65) Prior Publication Data
US 2016/0305506 A1    Oct. 20, 2016

Related U.S. Application Data

(60) Provisional application No. 61/905,876, filed on Nov. 19, 2013.

(51) Int. Cl.
| | | |
|---|---|---|
| *B65D 63/00* | (2006.01) | |
| *F16G 11/12* | (2006.01) | |
| *F16G 15/00* | (2006.01) | |
| *F16G 3/00* | (2006.01) | |
| *B60P 7/08* | (2006.01) | |

(52) U.S. Cl.
CPC ............ *F16G 11/12* (2013.01); *B60P 7/0807* (2013.01); *B60P 7/0823* (2013.01); *F16G 3/006* (2013.01); *F16G 15/00* (2013.01)

(58) Field of Classification Search
USPC ....................................................... 248/499
See application file for complete search history.

(56) References Cited

U.S. PATENT DOCUMENTS

| | | | | | |
|---|---|---|---|---|---|
| 1,549,638 | A | * | 8/1925 | Wallace ............... | B60R 25/086 70/14 |
| 2,564,821 | A | * | 8/1951 | Smith ................... | B60P 7/0838 24/273 |
| 3,149,821 | A | * | 9/1964 | Wallace ................ | B60P 3/073 24/270 |
| 3,954,252 | A | * | 5/1976 | Lyons .................... | F16G 15/00 24/270 |
| 3,974,668 | A | * | 8/1976 | McWhorter ........ | E05B 73/0005 70/14 |

(Continued)

FOREIGN PATENT DOCUMENTS

CA        2157977  A1    3/1997

OTHER PUBLICATIONS

Web Sling & Tie Down Association, Inc.; Recommended Standard Specification for Load Binders Used With Chain Tie Downs WSTDA-T-6; Trade Publication; 2010; All Pages; Author Is Web Sling & Tie Down Association, Inc.; Published in the US.

(Continued)

*Primary Examiner* — Monica Millner

(57) ABSTRACT

An anchor point for a lever binder is disclosed herein. The anchor point includes a collar. The anchor point also includes a cap including a base and at least one arm. The collar and the cap cooperate to form an aperture for receiving a handle of a lever binder.

14 Claims, 4 Drawing Sheets

(56) References Cited

U.S. PATENT DOCUMENTS

| | | | | |
|---|---|---|---|---|
| 3,988,005 A | * | 10/1976 | Mooney | F16G 15/00 24/68 CD |
| 4,057,983 A | * | 11/1977 | Morgan | A63C 11/006 24/327 |
| 4,418,891 A | | 12/1983 | Kallaes et al. | |
| 4,693,097 A | | 9/1987 | Rivera | |
| 6,141,836 A | * | 11/2000 | Thornton | B60P 7/0838 24/270 |
| 6,477,747 B1 | * | 11/2002 | Flagg | B60P 7/0838 24/68 CD |
| 6,789,405 B1 | * | 9/2004 | Mathers | E05B 73/0076 70/14 |
| 7,913,363 B2 | * | 3/2011 | Scott | F16G 15/00 24/270 |
| 2004/0064921 A1 | | 4/2004 | Mittleider | |

OTHER PUBLICATIONS

PCT International Bureau; International Search Report for PCT/IB2014/002925; dated May 5, 2015.

* cited by examiner

LEVER BINDER

CROSS-REFERENCE TO RELATED APPLICATION

This application claims the benefit of priority to U.S. Provisional Patent Application Ser. No. 61/905,876 for a LEVER BINDER, filed on Nov. 19, 2013, which is hereby incorporated by reference in its entirety. This application claims the benefit of priority to PCT/IB2014/002925, for a LEVER BINDER, filed on Nov. 18, 2014.

BACKGROUND

1. Field

The invention relates to a lever binder.

2. Description of Related Prior Art

A lever binder is a mechanical lever device designed to tighten a chain or cable for securing a load. The device applies an over-center movement and stores kinetic energy in the handle.

SUMMARY

An anchor point for a lever binder is disclosed herein. The anchor point includes a collar. The anchor point also includes a cap including a base and at least one arm. The collar and the cap cooperate to form an aperture for receiving a handle of a lever binder.

BRIEF DESCRIPTION OF THE DRAWINGS

The detailed description set forth below references the following drawings.

DETAILED DESCRIPTION OF AN EXEMPLARY EMBODIMENT

The invention, as demonstrated by the exemplary embodiment described below, can provide an enhanced lever binder. The exemplary embodiment provides advantages over known lever binders. The exemplary embodiment provides an anchor point for affixing a portion of a chain or cable rendered at least partially taut by the lever binder. This allows the loose portion of the chain to be held away from the taut portion of the chain. A handle of the lever binder can serve in moving the load held together by the taut portion of the chain.

Figure 1:
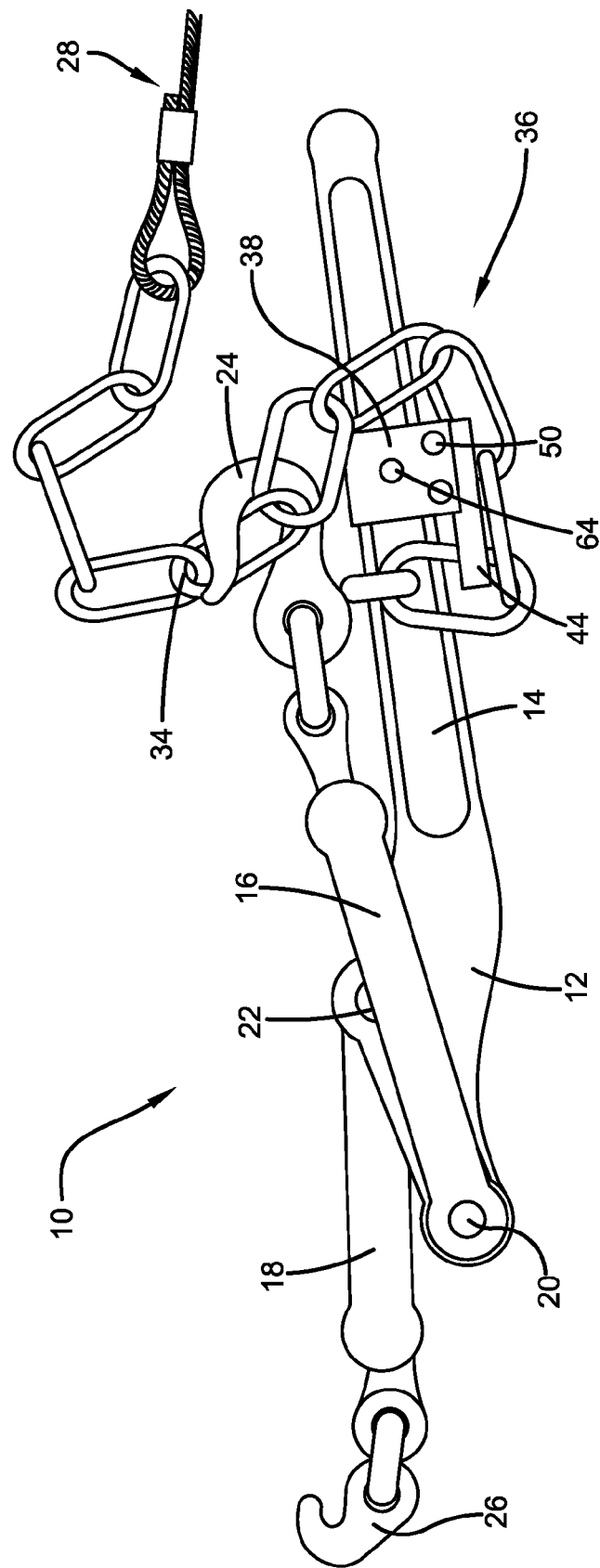
FIG. 1 is a first perspective view of a lever binder according to an exemplary embodiment of the invention.

Referring now to FIG. 1, a lever binder 10 according to an exemplary embodiment includes a body portion 12. A handle 14 extends from and is integrally-formed with the body portion 12. "Integrally-formed" refers to the fact that in the exemplary embodiment the body portion 12 and the handle 14 are formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

The lever binder 10 also includes first and second arms 16, 18 mounted for pivoting movement relative to the body portion 12. The first arm 16 is connected to the body portion 12 through a pivot pin 20. The second arm 18 is connected to the body portion 12 through a pivot pin 22.

Figure 2:
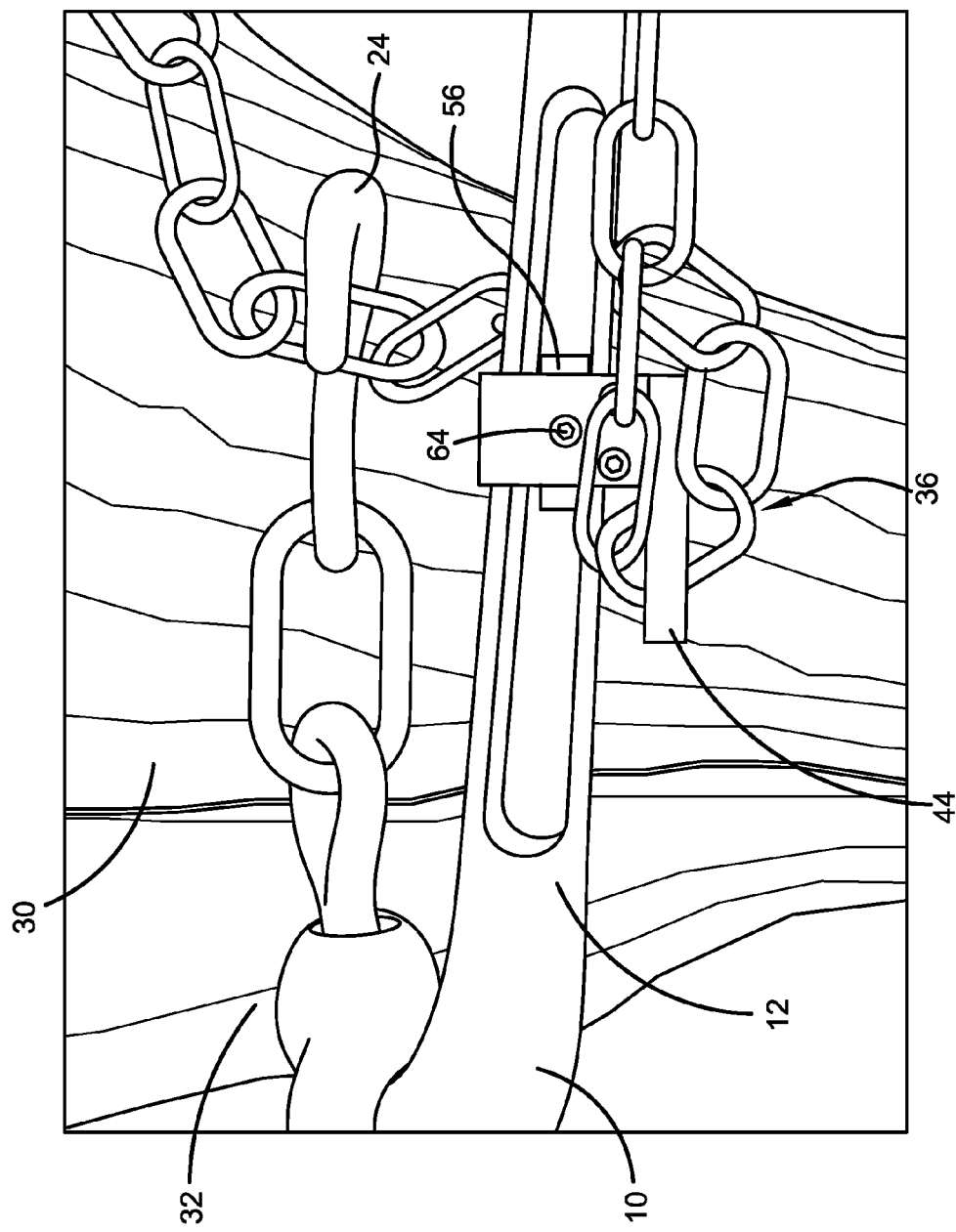
FIG. 2 is a second perspective view of the exemplary lever binder in operation.

Hooks 24, 26, respectively, are disposed for pivoting movement at the distal ends of arms 16, 18. The hooks 24, 26 can be connected to the arms 16, 18 through chain links or any other arrangement allowing the hooks 24, 26 to move while connected to the arms 16, 18. In operation, a cable or chain 28 can be encircled around a load, such as a group of logs 30, 32 as shown in FIG. 2. The cable 28 or chain can be drawn as taut as possible around the load while the hooks 24, 26 are spaced from one another some distance greater than a minimum possible distance of separation. A loop or chain link 34 at a first end of the chain 28 can be received by the hook 24 and a loop (not illustrated) at a second end of the chain 28 can be received by the hook 26. The handle 14 can then be rotated to minimize the distance between the hooks 24, 26 and maximize the tautness of the chain 28. This is an example of an over-center mechanism.

The exemplary lever binder 10 includes an anchor point 36. The anchor point 36 is releasibly mounted to the body portion 12. The anchor point 36 is adjustably positionable along the handle 14. The exemplary anchor point 36 is releasibly attachable to the handle 14. The exemplary assembly 36 includes a u-shaped collar 38 that can receive the handle 14. The exemplary assembly 36 also includes a cap 40 that can cooperate with the collar 38 to surround the handle 14. The collar 38 and the cap 40 cooperate to form an aperture 72 for receiving the handle 14 of the lever binder 10. The exemplary aperture 72 is non-circular to prevent the anchor point 36 from rotating relative to the lever binder 10 after being mounted on the lever binder 10. The collar 38 and the cap 40 can be releasibly engaged with one another.

The cap 40 includes a base 42 and at least one arm fixedly engaged together. The base 42 can include a tapered surface 48 for engaging and centering the handle 14 in the collar 38. In the exemplary embodiment, first and second arms 44 and 46 project away from one another, in opposite directions, along the handle 14. The first and second arms, 44, 46 can extend along a center axis 74 of the aperture 72. The first and second arms 44, 46 can be round stock or some other shape. Alternative embodiments may include a single arm.

The collar 38 can be releasibly engaged with the base 42 through fasteners, such as fastener 50. The fastener 50 can be received in aligned apertures 52, 54 in the collar 38 and base 42, respectively. One or both of the apertures 52, 54 can be threaded. As many fasteners as desired can be used to interconnect the collar 38 and the base 42.

Figure 3:
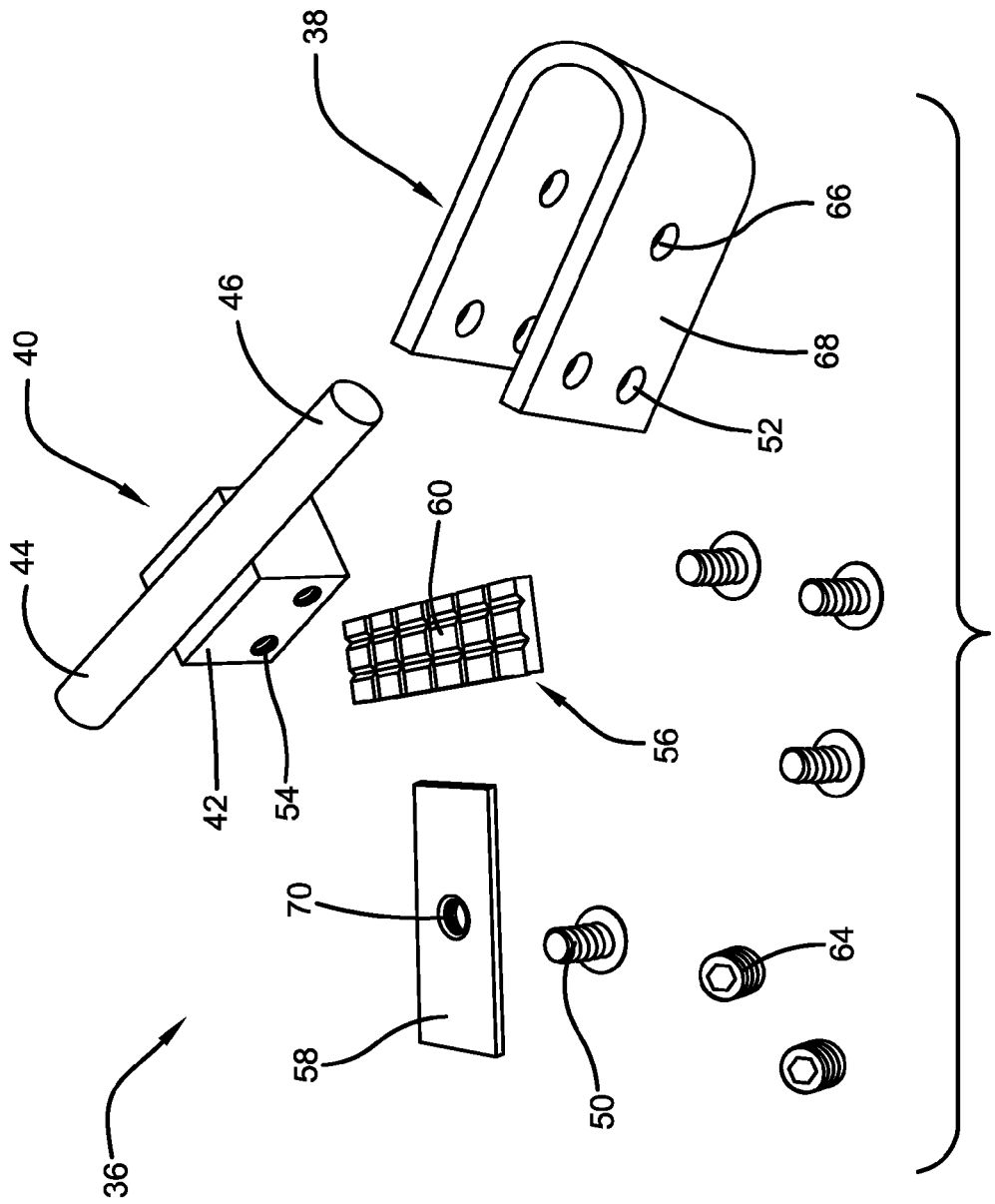
FIG. 3 is a third perspective view of sub-components of the exemplary lever binder.

The exemplary assembly 36 includes first and second wedges 56, 58 mountable between the sides of the collar 38 and the handle 14. The wedges 56, 58 can include inward faces defining respective discontinuous surfaces 60, 62 facing into the handle aperture 72. The discontinuous surfaces 60, 62 can define friction surfaces that contact and engage the handle 14. In FIG. 3, the wedge 58 is upside down, with the friction surface 62 being face-down. The friction surfaces 60, 62 can be exposed in the handle aperture 72. The wedges 56, 58 can be pressed against the handle 14 to increase frictional resistance to relative movement through a set screw, such as set screw 64. The set screw 64 can be received in a threaded aperture 66 formed in a side wall 68 of the collar 38. The set screw 64 can be threadingly engageable with the threaded aperture 66. FIG. 3 shows that the wedges 56, 58 can include a centering depression to receive a set screw, such as centering depression 70 in wedge 58. As many set screws as desired can be used to urge each wedge 56, 58 against the handle 14. The wedges 56, 58 can be shaped to conform to the shape of the handle 14, such as to fit into a depression in the handle however the depression is shaped.

In one exemplary operation for assembling the lever binder 10, the wedges 56, 58 can be positioned at any desired position along the handle 14. The collar 38 can be placed on the handle 14 to overlap the wedges 56, 58. Set screws on opposite sides of the collar 38 can be rotated to urge the wedges 56, 58 against the handle 14 and fixedly, but releasibly, engage the handle 14, wedges 56, 58, and collar 38 together. It is noted that the set screws can also directly engage the handle 14, passing through the wedges 56, 58. The wedges 56, 58 can be positioned in the handle aperture 72. The cap 40 can be inserted over the handle 14 and apertures 52 and 54 can be aligned. Fastener 50 can be inserted in the apertures 52, 54 to fixedly, but releasibly, engage the cap 40 and collar 38 together. The order of these steps can be varied.

The cable 38 can be extended about a load and loops or links at opposite ends of the cable 38 can be received on hooks 24 and 26. The handle 14 can be rotated over-center to bring the hooks 24, 26 closer together and secure the load. The non-taut portion of the cable 38 or chain can be extended between one of the arms 44, 46 and the handle 14. Components of the lever binder 50 can be sized so that gap between the arms 44, 46 and the handle 14 accommodates the smallest of the three dimensions of a chain link. This is shown in FIG. 2. It is noted that a first chain link can be positioned between the arm 44 and the handle 14 and second chain link can be positioned between the arm 46 and the handle 14.

Figure 4:
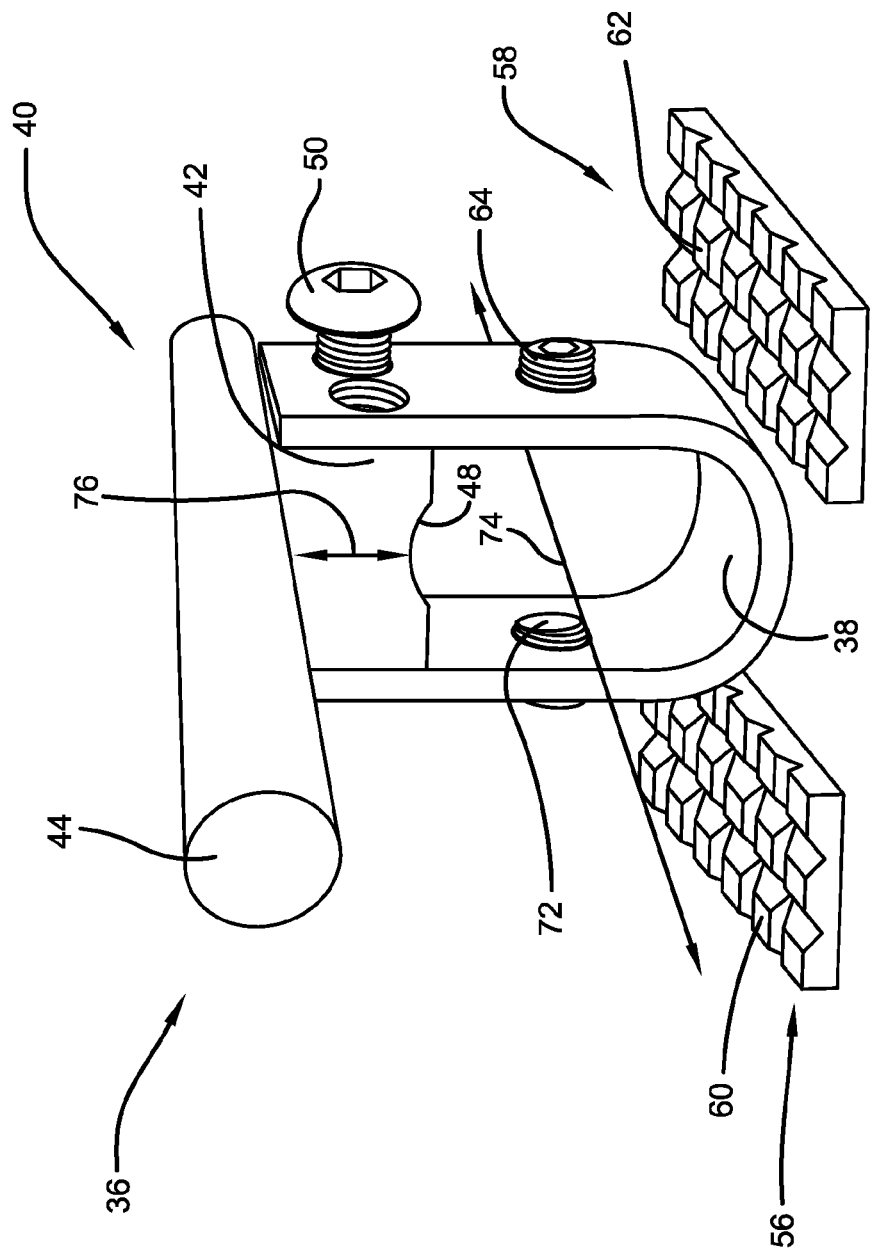
FIG. 4 is a fourth perspective view of sub-components of the exemplary lever binder partially assembly together.

The aperture 72 can be centered on the axis 74. The first and second arms 44, 46 can be positioned a radial distance outward of the aperture 72 relative to the axis 74. The distance is referenced at 76 in FIG. 4. The radial distance 76 can be between substantially fourteen and forty-two millimeters (sizes of standard steel link chains). The radial distance 76 can be substantially the diameter of the stock used to form the chain 28 so that one of the links of the chain 28 can received between the handle 14 and one of the first and second arms 44, 46. This can inhibit the chain 28 from be drawn through the gap between the handle 14 and one of the first and second arms 44, 46 since links on opposite sides of the link positioned between the handle 14 and one of the first and second arms 44, 46 will be arranged such that their external widths will be confronting the gap and their external widths are greater than the gap. This is shown in FIG. 2.

As noted above, specific embodiments of the broader invention can include one arm 44, 46 or both arms. FIG. 1 shows an embodiment with a single arm 44. In the exemplary embodiment, the arm 46 is useful to prevent movement of the chain and thereby prevent opening of the handle 14. The arm 44 is desirable in the exemplary embodiment to minimize the length of chain freely-hanging from the bound group of logs; this is especially desirable during transport.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An anchor point for a lever binder comprising:
   a collar configured to partially surround a handle of the lever binder;
   a cap including a base and at least one arm, wherein the collar and the cap cooperate to form an aperture surrounding the handle of the lever binder, the aperture centered on an axis, and wherein the at least one arm extends parallel to the axis and to the handle of the lever binder;
   wherein the collar and the cap are releasibly engaged with one another; and
   wherein the anchor point is further defined as adjustably positionable along the handle.

2. The anchor point of claim 1 wherein the aperture is non-circular.

3. The anchor point of claim 1 wherein the at least one arm is further defined as first and second arms.

4. The anchor point of claim 1 wherein the at least one arm is positioned a radial distance fully outward of the aperture relative to the axis and spaced from the handle.

5. The anchor point of claim 4 wherein the radial distance is further defined as between substantially fourteen and forty-two millimeters.

6. A kit for forming an anchor point on a lever binder comprising:
   a collar configured to partially surround a handle of the lever binder;
   a cap including a base and at least one arm, wherein the collar and the base of the cap cooperate to form a handle aperture surrounding the handle of the lever binder and the at least one arm is positioned on the base fully outside of the handle aperture;
   at least one threaded aperture extending through one of the collar and the cap, wherein the at least one threaded aperture extends to the handle aperture; and
   at least one set screw threadingly engageable with the at least one threaded aperture.

7. The kit of claim 6 wherein the at least one threaded aperture is further defined as extending through the collar.

8. A kit for forming an anchor point on a lever binder comprising:
   a collar;
   a cap including a base and at least one arm, wherein the collar and the cap cooperate to form a handle aperture for receiving a handle of a lever binder;
   at least one threaded aperture extending through one of the collar and the cap, wherein the at least one threaded aperture extends to the handle aperture;
   at least one set screw threadingly engageable with the at least one threaded aperture; and
   at least one friction surface exposed in the handle aperture.

9. A kit for forming an anchor point on a lever binder comprising:
   a collar;

a cap including a base and at least one arm, wherein the collar and the cap cooperate to form a handle aperture for receiving a handle of a lever binder;

at least one threaded aperture extending through one of the collar and the cap, wherein the at least one threaded aperture extends to the handle aperture;

at least one set screw threadingly engageable with the at least one threaded aperture; and at least one wedge positioned in the handle aperture.

10. The kit of claim 9 wherein the at least one wedge further comprises:

a centering depression positioned to receive the at least one set screw.

11. A kit for forming an anchor point on a lever binder comprising:

a collar;

a cap including a base and at least one arm, wherein the collar and the cap cooperate to form a handle aperture for receiving a handle of a lever binder;

at least one threaded aperture extending through one of the collar and the cap, wherein the at least one threaded aperture extends to the handle aperture;

at least one set screw threadingly engageable with the at least one threaded aperture; and wherein:

the at least one threaded aperture includes first and second threaded apertures respectively extending through opposite sides of one of the collar and the cap; and the at least one set screw includes first and second set screws each threadingly engageable with one of the first and second threaded apertures.

12. A kit for forming an anchor point on a lever binder comprising:

a collar;

a cap including a base and at least one arm, wherein the collar and the cap cooperate to form a handle aperture for receiving a handle of a lever binder;

at least one threaded aperture extending through one of the collar and the cap, wherein the at least one threaded aperture extends to the handle aperture;

at least one set screw threadingly engageable with the at least one threaded aperture;

wherein the collar and the cap are fixedly engaged with one another; and first and second wedges respectively disposed on opposite sides of the handle aperture.

13. The kit of claim 12 wherein each of the first and second wedges further comprise:

respective inward faces defining respective discontinuous surfaces facing into the handle aperture;

respective outward faces opposite to the respective inward faces and defining respective centering depressions facing toward the collar.

14. A lever binder and anchor point assembly comprising:

a body portion with a handle;

first and second arms mounted for pivoting movement relative to the body portion, the first arm connected to the body portion through a pivot pin and the second arm is connected to the body portion through a pivot pin;

first and second hooks disposed for pivoting movement at the distal ends of the first and second arms;

an anchor point including a collar and a cap including a base and at least one arm, wherein the collar and the cap cooperate to form an aperture extending along a center axis for receiving the handle and wherein the at least one arm extends parallel to the center axis; and wherein the anchor point is further defined as releasibly mounted to the body portion.

\* \* \* \* \*